(12) United States Patent
Marlow

(10) Patent No.: US 12,418,155 B2
(45) Date of Patent: *Sep. 16, 2025

(54) LOW-POWER SOURCE OF SQUEEZED LIGHT

(71) Applicant: The MITRE Corporation, McLean, VA (US)

(72) Inventor: Bonnie L. Marlow, Ashburn, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/659,303

(22) Filed: May 9, 2024

(65) Prior Publication Data

US 2024/0297473 A1    Sep. 5, 2024

Related U.S. Application Data

(63) Continuation of application No. 18/121,186, filed on Mar. 14, 2023, now Pat. No. 12,021,344, which is a
(Continued)

(51) Int. Cl.
    *H01S 3/00*        (2006.01)
    *G02F 1/35*        (2006.01)
    (Continued)

(52) U.S. Cl.
    CPC .......... *H01S 3/0057* (2013.01); *G02F 1/3536* (2013.01); *H01S 3/0092* (2013.01);
(Continued)

(58) Field of Classification Search
    CPC ............................ G02F 1/3536; H01S 3/0092
    See application file for complete search history.

(56) References Cited

U.S. PATENT DOCUMENTS

| | | | |
|---|---|---|---|
| 7,453,626 B2 * | 11/2008 | Lett ...................... | G02F 1/3536 359/326 |
| 2021/0184416 A1 | 6/2021 | Marlow | |
| 2023/0231353 A1 | 7/2023 | Marlow | |

OTHER PUBLICATIONS

Kim, "Atomic resonant single-mode squeezed light from four-wave mixing through feedforward," Aug. 2019, Optics Letters, vol. 44, No. 19, p. 4630-4633 (Year: 2019).*

(Continued)

*Primary Examiner* — Michael Carter
(74) *Attorney, Agent, or Firm* — Sterne, Kessler, Goldstein & Fox P.L.L.C.

(57) ABSTRACT

A degenerate four-wave mixing (DFWM) squeezed light apparatus includes one or more pump beams, a probe beam, a vapor cell, a repump beam, and a detector. The one or more pump beams includes an input power of no greater than about 150 mW. The vapor cell includes an atomic vapor configured to interact with overlapped pump and probe beams to generate an amplified probe beam and a conjugate beam. The repump beam is configured to optically pump the atomic vapor to a ground state and decrease atomic decoherence of the atomic vapor. The detector is configured to measure squeezing due to quantum correlations between the amplified probe beam and the conjugate beam. The one or more pump beams, the probe beam, and the repump beam are configured to generate two-mode squeezed light by DFWM with squeezing of at least 3 dB below shot noise.

20 Claims, 6 Drawing Sheets

Related U.S. Application Data continuation of application No. 17/117,331, filed on Dec. 10, 2020, now Pat. No. 11,637,408.

(60) Provisional application No. 62/946,539, filed on Dec. 11, 2019.

(51) Int. Cl.
*H01S 3/0941* (2006.01)
*H01S 3/227* (2006.01)
*H01S 3/16* (2006.01)

(52) U.S. Cl.
CPC ............ *H01S 3/0941* (2013.01); *H01S 3/227* (2013.01); *H01S 3/169* (2013.01); *H01S 2301/02* (2013.01)

(56) References Cited

OTHER PUBLICATIONS

McCormick, "Strong relative intensity squeezing by four-wave mixing in rubidium vapor," 2007, Optics Letters, vol. 32 No. 2, p. 178-180. (Year: 2007).*
Ulrik L. Andersen et al., "30 years of squeezed light generation," Physica Scripta 91, 053001, Apr. 13, 2016, 12 pages.
Saesun Kim and Alberto M. Marino, "Atomic Resonant Single-Mode Squeezed Light from Four-Wave Mixing through Feedforward," Optics Letters, vol. 44, Issue 19, pp. 4630-4633, 2019, 5 pages.
F. K. Fatemi, "Cylindrical vector beams for rapid polarization-dependent measurements in atomic systems," Optics Express, vol. 19, Issue 25, pp. 25143-25150, 2011, 8 pages.
Tian Li et al., "Degenerate four-wave mixing in atomic ytterbium," J. Opt. Soc. Am. B, vol. 29, No. 10, pp. 2848-2851, Oct. 2012, 5 pages.
Neil Corzo et al., "Multi-spatial-mode single-beam quadrature squeezed states of light from four-wave mixing in hot rubidium vapor," Optics Express, vol. 19, No. 22, pp. 21358-21369, Oct. 2011, 13 pages.
Matthew T. Hummon et al., "Photonic chip for laser stabilization to an atomic vapor with 10E-11 instability," Optica, vol. 5, No. 4, pp. 443-449, Apr. 2018, 7 pages.
McCormick, "Strong relative intensity squeezing by four-wave mixing in rubidium vapor," 2007, Optics Letters, vol. 32, No. 2, p. 178-180.
Roy S. Bondurant et al., "Degenerate four-wave mixing as a possible source of squeezed-state light," Phys. Rev. A, vol. 30, No. 1, pp. 343-353, Jul. 1, 1984, 11 pages [https://doi.org/10.1103/PhysRevA.30.343].
Prem Kumar and Mikhail I. Kolobov, "Degenerate four-wave mixing as a source for spatially-broadband squeezed light," Opt. Commun., vol. 104, No. 4-6, pp. 374-378, Jan. 1, 1994, 5 pages [https://doi.org/10.1016/0030-4018(94)90573-8].
Andrew M. C. Dawes et al., "All-Optical Switching in Rubidium Vapor," Science, vol. 308, No. 5722, pp. 672-674, Apr. 29, 2005, 8 pages [https://doi.org/10.1126/science.1110151].
Lingbang Zhu et al., "Bright narrowband biphoton generation from a hot rubidium atomic vapor cell," Appl. Phys. Lett., vol. 110, No. 16, 161101, Apr. 17, 2017, 5 pages [https://doi.org/10.1063/1.4980073].
Vincent Boyer et al., "Entangled Images from Four-Wave Mixing," Science, vol. 321, No. 5888, pp. 544-547, Jul. 25, 2008, 5 pages [https://doi.org/10.1126/science.1158275].
Christian Peuntinger et al., "Distribution of Squeezed States through an Atmospheric Channel," Phys. Rev. Lett., vol. 113, No. 6, 060502, Aug. 4, 2014, 7 pages [https://doi.org/10.1103/PhysRevLett.113.060502].
Henning Vahlbruch et al., "Detection of 15 dB Squeezed States of Light and their Application for the Absolute Calibration of Photo-electric Quantum Efficiency," Phys. Rev. Lett., vol. 117, No. 11, 110801, Sep. 6, 2016, 5 pages [https://doi.org/10.1103/PhysRevLett.117.110801].
Florian Wolfgramm et al., "Squeezed-Light Optical Magnetometry," Phys. Rev. Lett., vol. 105, No. 5, 053601, Jul. 29, 2010, 4 pages [https://doi.org/10.1103/PhysRevLett.105.053601].
M. D. Reid and D. F. Walls, "Quantum theory of nondegenerate four-wave mixing," Phys. Rev. A, vol. 34, No. 6, pp. 4929-4955, Dec. 1, 1986, 27 p. [https://doi.org/10.1103/PhysRevA.34.4929].
F. Hudelist et al., "Quantum metrology with parametric amplifier-based photon correlation interferometers," Nat. Commun., vol. 5, 3049, Jan. 29, 2014, 6 pages [https://doi.org/10.1038/ncomms4049].
M. D. Reid and D. F. Walls, "Generation of squeezed states via degenerate four-wave mixing," Phys. Rev. A, vol. 31, No. 3, pp. 1622-1635, Mar. 1, 1985, 14 pages [https://doi.org/10.1103/PhysRevA.31.1622].
K. Jensen et al., "Quantum memory for entangled continuous-variable states," Nat. Phys., vol. 7, pp. 13-16, Nov. 7, 2010, 17 pages [https://doi.org/10.1038/nphys1819].
Tian Li et al., "Improved measurement of two-mode quantum correlations using a phase-sensitive amplifier," Opt. Express, vol. 25, No. 18, pp. 21301-21311, Sep. 4, 2017, 11 pages [https://doi.org/10.1364/OE.25.021301].
Ian D. Leroux et al., "Orientation-Dependent Entanglement Lifetime in a Squeezed Atomic Clock," Phys. Rev. Lett., vol. 104, No. 25, 250801, Jun. 25, 2010, 4 pages [https://doi.org/10.1103/PhysRevLett.104.250801].
Alfredo Luis et al., "Nonlinear fiber gyroscope for quantum metrology," Phys. Rev. A, vol. 94, No. 1, 013830, Jul. 18, 2016, 8 pages [https://doi.org/10.1103/PhysRevA.94.013830].
J. Aasi et al., "Enhanced sensitivity of the LIGO gravitational wave detector by using squeezed states of light," Nat. Photon., vol. 7, pp. 613-619, Jul. 21, 2013, 13 pages [https://doi.org/10.1038/nphoton.2013.177].
Ivan V. Sokolov and Mikhail I. Kolobov, "Squeezed-light source for superresolving microscopy," Opt. Lett., vol. 29, No. 7, pp. 703-705, Apr. 1, 2004, 6 pages [https://doi.org/10.1364/OL.29.000703].
Ruifeng Liu et al., "Enhanced visibility of ghost imaging and interference using squeezed thermal light," Phys. Rev. A, vol. 93, No. 1, 013822, Jan. 13, 2016, 6 pages [https://doi.org/10.1103/PhysRevA.93.013822].
Qiang Wang et al., "Super-resolving quantum lidar: entangled coherent-state sources with binary-outcome photon counting measurement suffice to beat the shot-noise limit," Opt. Express, vol. 24, No. 5, pp. 5045-5056, Feb. 29, 2016, 12 pages [https://doi.org/10.1364/OE.24.005045].
S. Barreiro et al., "Polarization squeezing of light by single passage through an atomic vapor," Phys. Rev. A, vol. 84, No. 3, 033851, Sep. 28, 2011, 4 pages [https://doi.org/10.1103/PhysRevA.84.033851].

* cited by examiner

LOW-POWER SOURCE OF SQUEEZED LIGHT

CROSS REFERENCE TO RELATED APPLICATIONS

This application is a continuation of U.S. application Ser. No. 18/121,186, filed Mar. 14, 2023, which is a continuation of U.S. application Ser. No. 17/117,331, filed Dec. 10, 2020, now U.S. Pat. No. 11,637,408, which claims priority to U.S. Provisional Application No. 62/946,539, filed Dec. 11, 2019, which are hereby incorporated herein in their entireties by reference.

BACKGROUND

Field

The present disclosure generally relates to squeezed light apparatuses and systems, for example, low-power squeezed light sources.

Background

In quantum physics, an oscillating physical quantity (e.g., a light wave) cannot have precisely defined values at all phases of the oscillation. Squeezed light is a type of non-classical light in which one of its field quadratures has a reduced or "squeezed" noise at the expense of added noise in the other quadrature. Squeezed light can have a quantum noise reduction below a shot noise level, which has applications in precision optical measurements and quantum communication. Shot noise is the noise level that would be measured by coherent light of the same optical power when using the same detection scheme. Current techniques to generate quadrature-squeezed light require various optical components and high input powers and, thus, are impractical for scaling to a low-power and portable device.

SUMMARY

Accordingly, there is a need to provide a low-power and portable squeezed light source with a reduced size, weight, and power (SWaP) to improve the precision of optical measurements and implement continuous-variable quantum communication protocols. To meet this need using degenerate four-wave mixing (DFWM), excess noise must be reduced.

In some embodiments, a degenerate four-wave mixing (DFWM) squeezed light apparatus includes one or more pump beams, a probe beam, a vapor cell, a repump beam, and a balanced differential detector or a joint homodyne detector. The one or more pump beams includes an input power of no greater than about 150 mW. The probe beam is configured to overlap the one or more pump beams. The vapor cell includes an atomic vapor, a first window, and a second window. The atomic vapor is configured to interact with the overlapped pump and probe beams to generate an amplified probe beam and a conjugate beam. The repump beam is configured to optically pump the atomic vapor to a ground state and decrease atomic decoherence of the atomic vapor. The balanced differential detector or the joint homodyne detector is configured to measure squeezing due to quantum correlations between the amplified probe beam and the conjugate beam. The one or more pump beams, the probe beam, and the repump beam are configured to reduce spontaneous emission of the atomic vapor and generate two-mode squeezed light by DFWM in the atomic vapor with squeezing of at least 3 dB below shot noise.

In some embodiments, the input power of the one or more pump beams is no greater than about 50 mW. In some embodiments, the input power of the one or more pump beams is no greater than about 20 mW.

In some embodiments, the repump beam is cylindrical. In some embodiments, the repump beam is an annulus. In some embodiments, the repump beam includes two counter-propagating annular repump beams. In some embodiments, an input power of the repump beam is no greater than about the input power of the one or more pump beams.

In some embodiments, the one or more pump beams, the probe beam, and the vapor cell are arranged in a forward-scattering geometry. In some embodiments, the one or more pump beams, the probe beam, and the vapor cell are arranged in a backward-scattering geometry.

In some embodiments, the two-mode DFWM squeezed light includes squeezing of at least 6 dB below shot noise. In some embodiments, the balanced differential detector includes an intensity-difference detector. In some embodiments, the joint homodyne detector includes a pair of homodyne detectors.

In some embodiments, the first and second windows have a temperature greater than an exterior surface of a cylindrical wall of the vapor cell. In some embodiments, a temperature of the vapor cell is about 30° C. to about 100° C. In some embodiments, the temperature is about 35° C. to about 45° C. In some embodiments, a longitudinal length of the vapor cell is about 0.5 cm to about 10 cm. In some embodiments, the atomic vapor includes a rubidium vapor.

In some embodiments, the DFWM squeezed light apparatus includes a portable diode laser. In some embodiments, the portable diode laser includes a volume of no greater than about 100 cm$^3$. In some embodiments, the portable diode laser includes an output power of no greater than about 150 mW. In some embodiments, the DFWM squeezed light apparatus includes a portable integrated photonic chip.

In some embodiments, a method of forming a low-power squeezed light source includes overlapping one or more pump beams and a probe beam. The one or more pump beams includes an input power of no greater than about 150 mW. In some embodiments, the method further includes interacting an atomic vapor with the overlapped pump and probe beams to generate an amplified probe beam and a conjugate beam. In some embodiments, the method further includes optically pumping the atomic vapor with a repump beam configured to decrease atomic decoherence of the atomic vapor. In some embodiments, the method further includes generating two-mode squeezed light by degenerate four-wave mixing (DFWM) in the atomic vapor with squeezing of at least 3 dB below shot noise.

In some embodiments, the overlapping includes applying an input power of the one or more pump beams no greater than about 50 mW. In some embodiments, the optical pumping includes an annular repump beam. In some embodiments, the two-mode DFWM squeezed light includes squeezing of at least 6 dB below shot noise. In some embodiments, the method further includes measuring an intensity-difference squeezing due to quantum correlations between the amplified probe beam and the conjugate beam with a balanced differential detector. In some embodiments, the method further includes measuring quadrature squeezing due to quantum correlations between the amplified probe beam and the conjugate beam with a joint homodyne detector.

Further features and exemplary aspects of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

FIG. 7A is a schematic partial cross-sectional illustration of the repump beam of FIG. 7, according to some embodiments.

Figure 1:
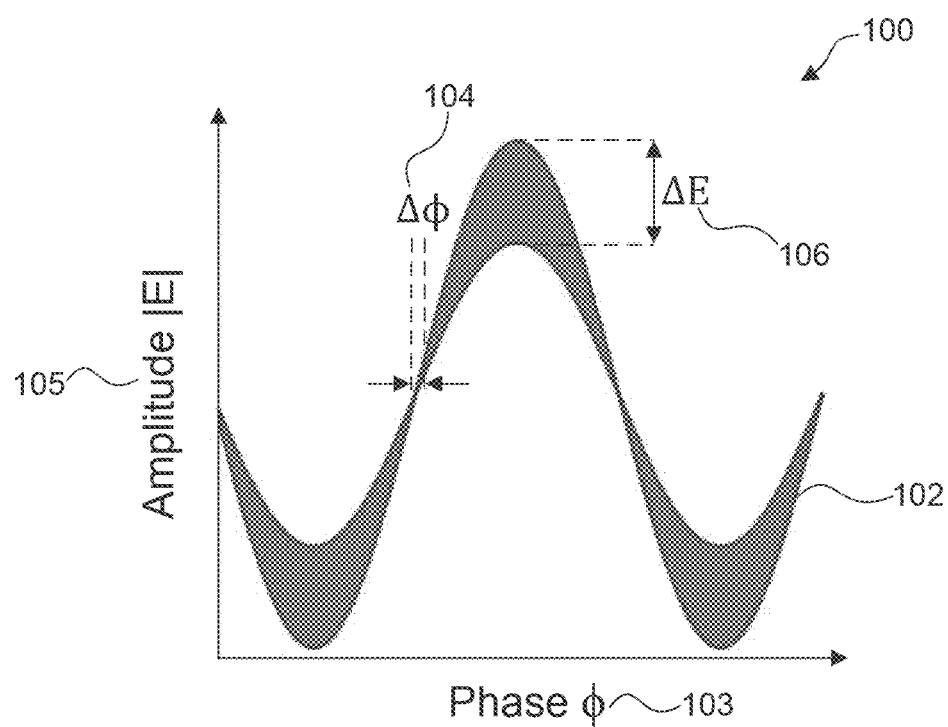
FIG. 1 is a schematic illustration of a squeezed light wave, according to some embodiments.

The features and exemplary aspects of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

The embodiment(s) described, and references in the specification to "one embodiment," "an embodiment," "an example embodiment," "some embodiments," etc., indicate that the embodiment(s) described may include a particular feature, structure, and/or characteristic, but every embodiment may not necessarily include the particular feature, structure, and/or characteristic. Moreover, such phrases are not necessarily referring to the same embodiment. Further, when a particular feature, structure, and/or characteristic is described in connection with an embodiment, it is understood that it is within the knowledge of one skilled in the art(s) to effect such feature, structure, and/or characteristic in connection with other embodiments whether or not explicitly described. The scope of this disclosure is not limited to the disclosed embodiment(s) but is instead defined by the claims appended hereto.

Spatially relative terms, such as "beneath," "below," "lower," "above," "on," "upper," and the like, may be used herein for ease of description to describe one element or feature's relationship to another element(s) or feature(s) as illustrated in the figures. The spatially relative terms are intended to encompass different orientations of the device in use or in operation in addition to the orientation depicted in the figures. The apparatus may be otherwise oriented (rotated 90 degrees or at other orientations) and the spatially relative descriptors used herein may likewise be interpreted accordingly.

The term "about" or "substantially" or "approximately" as used herein indicates the value of a given quantity that can vary based on a particular technology. Based on the particular technology, the term "about" or "substantially" or "approximately" can indicate a value of a given quantity that varies within, for example, 1-15% of the value (e.g., ±1%, ±2%, ±5%, ±10%, or ±15% of the value).

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM), random access memory (RAM), magnetic disk storage media, optical storage media, flash memory devices, and/or electrical, optical, acoustic, or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, and/or other devices executing the firmware, software, routines, instructions, etc.

Exemplary DFWM Squeezed Light Apparatuses

As discussed above, an oscillating physical quantity (e.g., a light wave) cannot have precisely defined values at all phases of the oscillation. In quantum optics, an optical phase space is a phase space in which all quantum states of an optical system are described. Each point in the optical phase space corresponds to a unique state (e.g., |α>) of the optical system.

Under the Heisenberg uncertainty principle, quantum uncertainty exists for certain pairs of physical properties. For example, quantum uncertainty exists for a light wave's quadratures, the electric field phase ($\phi$) and the electric field amplitude (|E|). Physical properties, such as the electric field phase ($\phi$) and the electric field amplitude (|E|), can become quantum operators. In quantum physics, an operator is a function over a space of physical states onto another space of physical states. Quadratures are defined as operators (e.g., $X_1$ and $X_2$) that represent the real and imaginary parts of a complex state a (e.g., the in-phase and the out-of-phase components of the light wave). The light wave can be represented by $E(t)=E_0[X_1 \sin(\omega t+\phi)-X_2 \cos(\omega t+\phi)]$, where $X_1$=amplitude quadrature and $X_2$=phase quadrature. The measured electric field amplitude (|E|) at the light wave's electric field phase ($\phi$) are the eigenvalues (e.g., scalar results of a linear transformation) of the normalized quadrature operator $X_\phi$, where $X_{\phi=0°}=X_1$ is the light wave's amplitude quadrature and $X_{\phi=90°}=X_2$ is the light wave's phase quadrature. $X_1$ and $X_2$ are non-commuting observables (e.g., no joint quantum probability, $[X_1, X_2]\neq 0$) and satisfy $\Delta X_1 \Delta X_2 \geq \frac{1}{4}$.

Quantum uncertainty is visible when identical measurements of the same quantity (e.g., observable) on identical objects (e.g., modes of light) give different results (e.g., eigenvalues). In quantum physics, a light wave is in a squeezed state if its electric field amplitude (|E|) for some phase ($\phi$) has a quantum uncertainty less than that of a coherent state (e.g., a state of the quantized electric field with maximal coherence and classical behavior). Thus, squeezing refers to a reduced quantum uncertainty. Further, a squeezed state must also have some phase ($\phi$) at which the electric field amplitude (|E|) is anti-squeezed (e.g., larger than a coherent state), in order to obey the Heisenberg uncertainty principle.

A squeezed state is a quantum state described by two non-commuting observables (e.g., $[X_1, X_2]\neq 0$) having a continuous spectra of eigenvalues (e.g., unbounded). The continuous spectra of eigenvalues, as opposed to a discrete spectra (e.g., bound states), provides for continuous-variable states (e.g., continuous value of energies) that can be used for universal quantum communication. For example, a squeezed state can be described by the light wave's electric field in the amplitude quadrature $X_1$ (e.g., phase 0°) and in the phase quadrature $X_2$ (e.g., phase 90°). Under the uncertainty principle, the product of the standard deviations of the amplitude $X_1$ and phase $X_2$ quadratures is $\Delta X_1 \Delta X_2 \geq \frac{1}{4}$. A quadrature-squeezed state of light is characterized by noise whose standard deviation in one quadrature is below that of coherent light of the same optical power.

Squeezed light is a type of non-classical light in which one of its field quadratures (e.g., amplitude $X_1$ or phase $X_2$) has a reduced ("squeezed") noise at the expense of added noise in the other quadrature. Squeezed light has a reduced quantum uncertainty while anti-squeezed light has a larger quantum uncertainty. Diminishing the quantum noise at a specific quadrature (e.g., phase $X_2$) of a light wave increases the noise of the complementary quadrature (e.g., amplitude $X_1$).

FIG. 1 illustrates squeezed light wave 100, according to various exemplary embodiments. Squeezed light wave 100 can include an oscillating electric field 102 (e.g., E(t)) with a first quadrature (e.g., phase 103) and a second quadrature (e.g., amplitude 105). As shown in FIG. 1, oscillating electric field 102 can include an anti-squeezed or increased amplitude uncertainty 106 and a squeezed or reduced phase uncertainty 104 (e.g., phase-squeezed light). Reduced phase uncertainty 104 can have a reduced quantum noise compared to the phase noise of a coherent field of the same optical power (e.g., shot noise). In some embodiments, oscillating electric field 102 can include an anti-squeezed or increased phase uncertainty and a squeezed or reduced amplitude uncertainty (e.g., amplitude-squeezed light).

Two-mode squeezing involves two modes of the electric field which exhibit quantum noise reduction below the shot noise level in a linear combination of the quadratures of the fields (e.g., phase and amplitude). Shot noise is the noise level that would be measured by coherent light of the same optical power when using the same detection scheme. Quantum information processing can be carried out with continuous variables in a parallel fashion to the ways in which binary data is processed. Physical quantities with a continuous spectrum (e.g., phase and amplitude) can be used for continuous-variable entanglement. Two-mode squeezing can be exploited to generate continuous-variable entanglement.

Continuous-variable entanglement refers to light beams in Einstein-Podolsky-Rosen (EPR) or entangled states that can be used for quantum information protocols. A continuous-variable system is a canonical infinite dimensional quantum system comprised of N bosonic (e.g., photonic) modes with an associated Hilbert space $H=\otimes^N_{k=1} H_k$. A Hilbert space is an abstract vector space possessing the structure of an inner product that allows length and angle to be measured. Each of these modes $H_k$ has an associated annihilation and creation operator $\hat{a}$, $\hat{a}^\dagger$, respectively. These operators obey the commutation relations $[\hat{a}_i, \hat{a}^\dagger_j]=\delta_{ij}$ and $[\hat{a}_i, \hat{a}_j]=[\hat{a}^\dagger_i, \hat{a}^\dagger_j]=0$. The space $H_k$ is spanned by the Fock basis $\{|n_k\rangle\}^\infty_{n=0}$ of eigenstates of the number operator $\hat{n}_k=\hat{a}^\dagger_k \hat{a}_k$. The Fock basis (space) constructs the quantum states space of a variable or unknown number of identical particles (e.g., photons) from a single particle Hilbert space ($H_k$). These eigenstates have the property that $\hat{n}|n\rangle = n|n\rangle$, $\hat{a}|n\rangle = \sqrt{(n)}|n-1\rangle$, and $\hat{a}^\dagger|n\rangle = \sqrt{(n+1)}|n+1\rangle$, as well as the fact that the vacuum state $|0\rangle$ is annihilated by $\hat{a}|0\rangle = 0$. In the absence of any interactions, these modes evolve according to the Hamiltonian $H=\Sigma_{k=1}(\hat{a}^\dagger_k \hat{a}_k + \frac{1}{2})$. Two quadrature operators $\hat{q}_x=\hat{a}_k+\hat{a}^\dagger_k$ and $\hat{p}_k=i(\hat{a}^\dagger_k - \hat{a}_k)$ (e.g., amplitude quadrature $X_1$ and phase quadrature $X_2$) can be defined, which act in a similar fashion to the position and momentum operators in a quantum harmonic oscillator. Continuous-variable entanglement can be generated by multiple photons in one light mode and/or nonlinear optical processes (e.g., optical frequency comb, optical parametric oscillator, non-degenerate four-wave mixing, etc.).

Squeezed light can be generated using nonlinear optical processes (e.g., non-degenerate four-wave mixing, parametric down-conversion, etc.). However, these techniques require various optical components, high input powers (e.g., greater than 500 mW), have low power conversion efficiencies (e.g., less than 0.1%), and are not currently compact (e.g., not easily portable). Thus, current techniques are impractical for scaling to a low-power and portable squeezed light source.

Four-wave mixing (FWM) is a nonlinear interaction between light and matter that permits the transfer of energy among four modes of the electric field via their interaction with a nonlinear medium (e.g., an atomic vapor). FWM is an intermodulation phenomenon in nonlinear optics, whereby interactions between two or three wavelengths produce two or one new wavelengths. Intermodulation is the amplitude modulation of signals containing two or more different frequencies, caused by nonlinearities or time variance in the system. When three frequencies ($f_1$, $f_2$, and $f_3$) interact with a nonlinear medium, a fourth frequency ($f_4$) is formed by the scattering of the incident photons. Given three input frequencies ($f_1$, $f_2$, and $f_3$), the nonlinear system will output $\pm f_1 \pm f_2 \pm f_3$.

In degenerate four-wave mixing (DFWM), all four frequencies ($f_1$, $f_2$, $f_3$, and $f_4$) are the same. DFWM occurs if three fields (e.g., electric fields) of the same frequency interact with a nonlinear medium (e.g., an atomic vapor) and generate and/or amplify a fourth field of the same frequency. For example, three laser beams of the same frequency can interact in a nonlinear medium (e.g., atomic vapor) to produce a fourth degenerate beam. At least three of the four fields must have distinct wavevectors (e.g., k-vectors), defining directions of propagation of the fields, but all four fields have the same frequency in vacuum. Compared to non-degenerate nonlinear optical processes, DFWM can generate squeezed light via a nonlinear optical process that requires fewer optical components and has a high power conversion efficiency (e.g., greater than 10%) at low input pump beam powers (e.g., less than 150 mW). For example, in rubidium (Rb), the $5S_{1/2}$ to $5P_{3/2}$ atomic transition (e.g., 780.2 nm) is easily accessible with a simple diode laser system.

In atomic physics and spectroscopy, fine structure is the splitting of spectral lines due to the coupling between the orbital and spin angular momenta of the valence electron. For example, for the $5S_{1/2}$ ground state of Rb, this total momentum, defined in units of Planck's constant hbar ($\hbar$), is designated by the fine structure subscript ½ (e.g., $5S_{1/2}$). Fine structure is the splitting of the main spectra lines of an atom (e.g., Rb) into two or more components, each representing a slightly different wavelength. Fine structure is a property of the atom. Fine structure is measured when an atom (e.g., Rb) emits light when transitioning from one energy state to another (e.g., the $5S_{1/2}$ to $5P_{3/2}$ atomic transition at 780.2 nm).

Hyperfine structure is the additional splitting of the fine structure spectral lines due to the interaction between the valence electron's momentum to the nuclear angular momentum. In hyperfine structure, line splitting is attributed to the fact that in addition to electron spin in an atom (e.g., fine structure), the atomic nucleus itself spins about its own axis. Hyperfine structure results from the interactions of the nucleus (or nuclei) with internally generated electric and magnetic fields. Energy states of the atom will be split into levels corresponding to slightly different energies. Each of these energy levels may be assigned a quantum number (n) and are called quantized levels. Hyperfine structure is a property of the atom. Hyperfine structure is measured when an atom (e.g., Rb) emits light when transitioning between these quantized energy levels. Hyperfine structure is characterized by energy shifts (e.g., wavelength shifts) and/or energy splittings (e.g., wavelength splittings) that are orders of magnitude smaller than those of a fine structure shift and/or split. For example, for the $5S_{1/2}$ ground state of $^{85}$Rb, the hyperfine energy state is designated by the parameter F (e.g., $5S_{1/2}$, F=3).

Doppler broadening of spectral lines is a result of thermal motion of an atomic vapor at a finite temperature relative to an optical field. Due to the finite temperature, the atoms are thermally excited and different velocities of the emitting atoms cause different Doppler shifts (e.g., change in frequency of a wave in relation to an observer who is moving relative to the wave source). Different Doppler shifts in turn cause the cumulative effect of line broadening.

For example, electrons in Rb atoms are found in the ground state, $5S_{1/2}$, and upon excitation are moved to a higher energy state depending on the discrete energy received (e.g., 780.2 nm). The $5S_{1/2}$ to $5P_{3/2}$ atomic transition can be approximated as a two-level atomic system with a hyperfine ground state (e.g., $5S_{1/2}$, F=3 for $^{85}$Rb, $5S_{1/2}$, F=2 for $^{87}$Rb) and a Doppler-broadened excited state. Atoms whose electron has decayed into another (lower) hyperfine ground state (e.g., $5S_{1/2}$, F=2 for $^{85}$Rb, $5S_{1/2}$, F=1 for $^{87}$Rb) can be treated as decohered atoms. Decohered atoms must be optically pumped back (increase in energy) into the ground state (e.g., $5S_{1/2}$, F=3 for $^{85}$Rb, $5S_{1/2}$, F=2 for $^{87}$Rb) before they can participate in the DFWM process.

Figure 2:
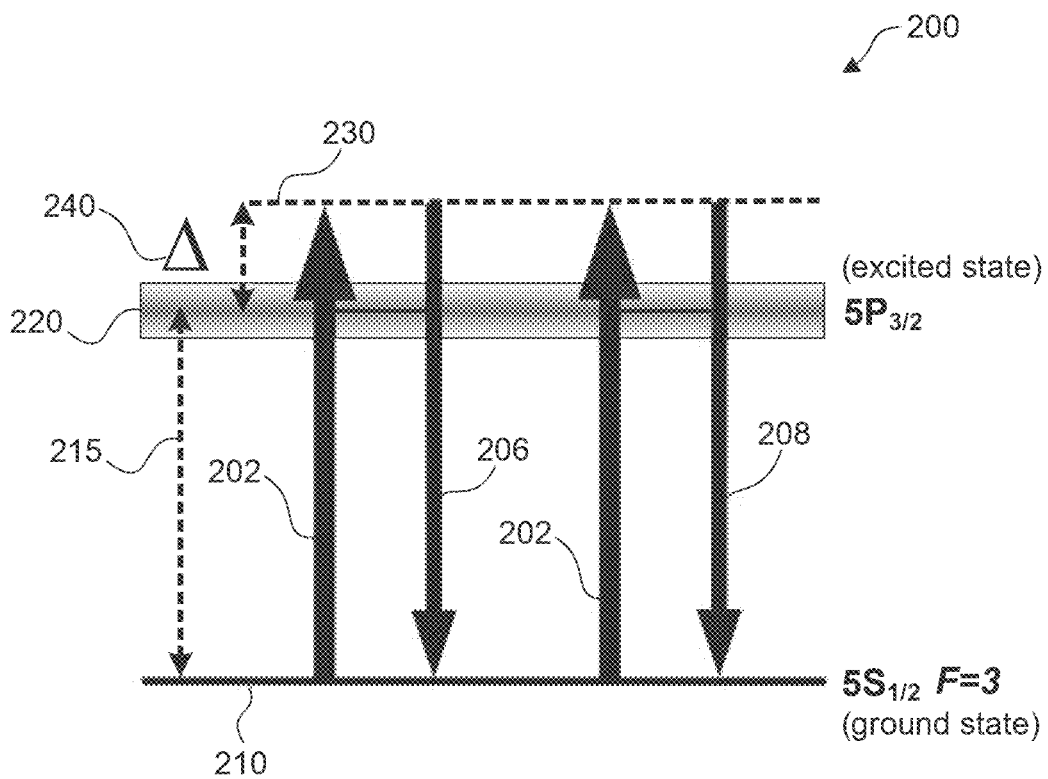
FIG. 2 is a schematic illustration of an energy diagram for degenerate four-wave mixing (DFWM) in a two-level atomic system, according to some embodiments.

FIG. 2 illustrates energy diagram 200 for DFWM, according to various exemplary embodiments. Energy diagram 200 can include a ground state 210 (e.g., $5S_{1/2}$, F=3), a Doppler-broadened excited state 220 (e.g., $5P_{3/2}$), and a virtual excited state 230 separated by a frequency detuning (Δ) 240 from Doppler-broadened excited state 220. Optical fields (e.g., pump beam(s) 202, probe beam 206) are frequency tuned to a frequency that is greater than the resonant ground-to-excited state 215 transition frequency by frequency detuning (Δ) 240. Resonant excitation (e.g., Δ=0) causes nearly all optical fields to be absorbed and spontaneously reemitted and, thus, squeezing cannot occur when frequency detuning (Δ) 240 is zero (e.g., Δ=0) or close to zero (e.g., Δ≈0). In some embodiments, frequency detuning (Δ) 240 can be at the edge of or just outside Doppler-broadened excited state 220. For example, frequency detuning (Δ) 240 can be about 300 MHz to about 800 GHz.

As shown in FIG. 2, energy diagram 200 can approximate a two-level atomic system with pump beam(s) 202 driving atomic transitions between ground state 210 and virtual excited state 230 to amplify probe beam 206 and produce conjugate beam 208. Pump beam(s) 202 can drive first and second atomic transitions in an atomic vapor (e.g., Rb atoms) from ground state 210 to virtual excited state 230. In the first transition, pump beam 202 excites an atom (e.g., Rb atom) in the atomic vapor from ground state 210 to virtual excited state 230, and probe beam 206 induces stimulated emission from virtual excited state 230 to ground state 210. This excitation-emission process changes the dipole moment of the atomic vapor. In the second transition, pump beam 202 excites atoms (e.g., Rb atoms) in the atomic vapor with the new atomic dipole moment and includes emission that produces conjugate beam 208. The interaction of pump beam 202 with the dipole moment induced in the atoms by the second transition then, in a synergistic manner, amplifies probe beam 206 of the first transition. In some embodiments, ground state 210 can be F=3 for a $^{85}$Rb vapor and/or F=2 for a $^{87}$Rb vapor. For example, as shown in FIG. 2, ground state 210 can be F=3 for a $^{85}$Rb vapor.

DFWM can utilize a two-level atomic system in which all beams have the same frequency. DFWM can occur even if only two beams interact (e.g., pump beam and probe beam). The pump and probe beams have the same frequency but different wavevectors (e.g., k-vectors) since they must propagate at a small angle relative to one another in order to conserve momentum in the DFWM process. The sum of the k-vectors of the pump beams must equal the sum of the k-vectors of the probe and conjugate beams.

In a backward-scattering DFWM geometry, two counter-propagating pump beams and a probe beam propagating at a small angle (e.g., small angle 305) relative to one of the pump beams overlap inside a nonlinear medium (e.g., an atomic vapor) and a conjugate beam is generated via a four-wave mixing mechanism. The forward pump beam and the probe beam propagate in one direction (e.g., forward) and the backward pump beam propagates in the opposite direction (e.g., backward). Thus, the conjugate beam (e.g., fourth beam) also comes out in the opposite direction (e.g., backward). The conjugate beam is a wavevector reversed replica of the probe beam (e.g., its phase is conjugate to that of the probe beam) and any classical noise present on the input probe beam will be canceled out upon joint detection.

Any sources of excess noise that arise after the nonlinear processes (e.g., that occur independently) on one or both beams will not be canceled out.

Figure 3:
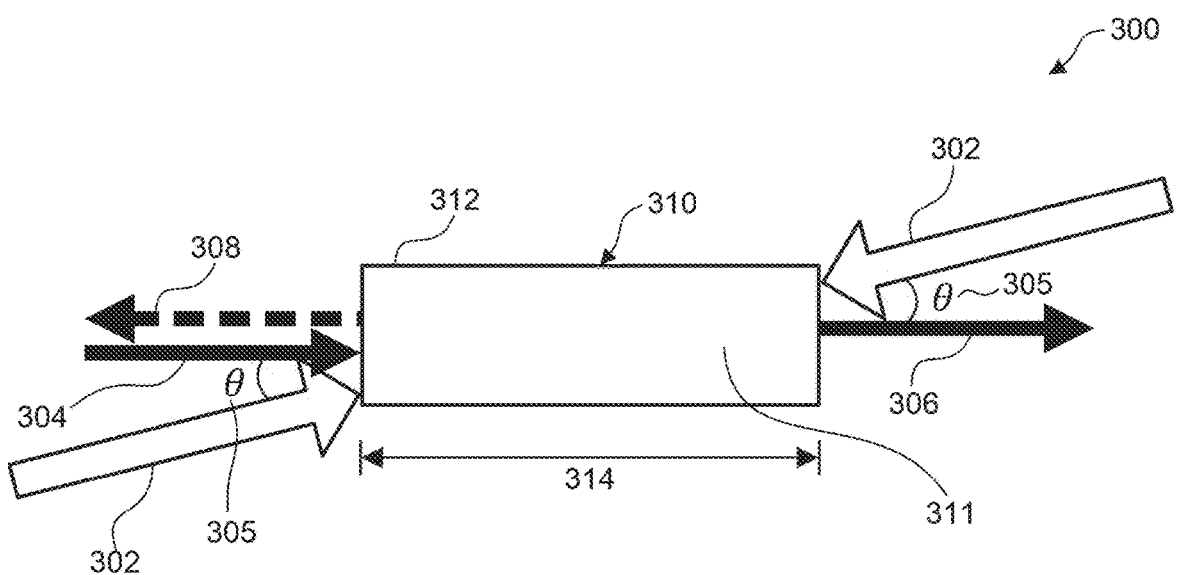
FIG. 3 is a schematic illustration of a backward-scattering geometry, according to some embodiments.

FIG. 3 illustrates backward-scattering geometry 300, according to various exemplary embodiments. Backward-scattering geometry 300 can include pump beams 302 and probe beam 304 impingent upon a vapor cell 310. Vapor cell 310 can include an atomic vapor 311 (e.g., Rb) enclosed within a container 312 extending a length 314. As shown in FIG. 3, the interaction of pump beams 302, probe beam 304, and atomic vapor 311 creates (e.g., via DFWM) amplified probe beam 306 and conjugate beam 308. Amplified probe beam 306 and conjugate beam 308 can be a squeezed light source, for example, two-mode squeezed light by DFWM with squeezing of at least 3 dB below shot noise. As shown in FIG. 3, pump beams 302 and probe beam 304 can propagate at small angle 305. In some embodiments, small angle 305 can be about 1 degree to about 10 degrees. For example, small angle 305 can be about 5 degrees. In some embodiments, backward-scattering geometry 300 can be utilized in DFWM squeezed light apparatus 500 and/or DFWM squeezed light system 900.

In a forward-scattering DFWM geometry, all input beams propagate in one direction (e.g., forward) and, thus, the conjugate beam (e.g., fourth beam) also propagates in the same direction (e.g., forward). All input beams can be focused and mixed using, for example, a single lens, which can create a high photon density and efficient wave mixing.

Figure 4:
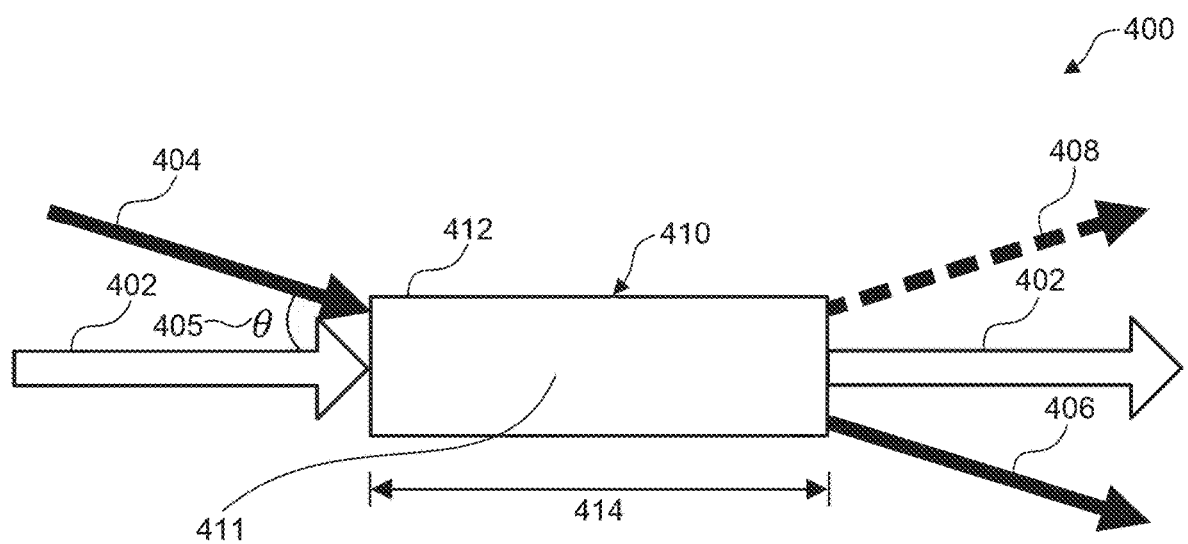
FIG. 4 is a schematic illustration of a forward-scattering geometry, according to some embodiments.

FIG. 4 illustrates forward-scattering geometry 400, according to various exemplary embodiments. Forward-scattering geometry 400 can include pump beam 402 and probe beam 404 impingent upon a vapor cell 410. Vapor cell 410 can include an atomic vapor 411 (e.g., Rb) enclosed within a container 412 extending a length 414. As shown in FIG. 4, the interaction of pump beam 402, probe beam 404, and atomic vapor 411 creates (e.g., via DFWM) amplified probe beam 406 and conjugate beam 408. Amplified probe beam 406 and conjugate beam 408 can be a squeezed light source, for example, two-mode squeezed light by DFWM with squeezing of at least 3 dB below shot noise. As shown in FIG. 4, pump and probe beams 402, 404 can propagate at small angle 405. In some embodiments, small angle 405 can be about 0.01 degrees to about 1 degree. For example, small angle 405 can be about 0.5 degrees. In some embodiments, forward-scattering geometry 400 can be utilized in DFWM squeezed light apparatus 500 and/or DFWM squeezed light system 900. For example, as shown in FIG. 5, DFWM squeezed light apparatus 500 can utilize a forward-scattering geometry similar to forward-scattering geometry 400 shown in FIG. 4.

Figure 5:
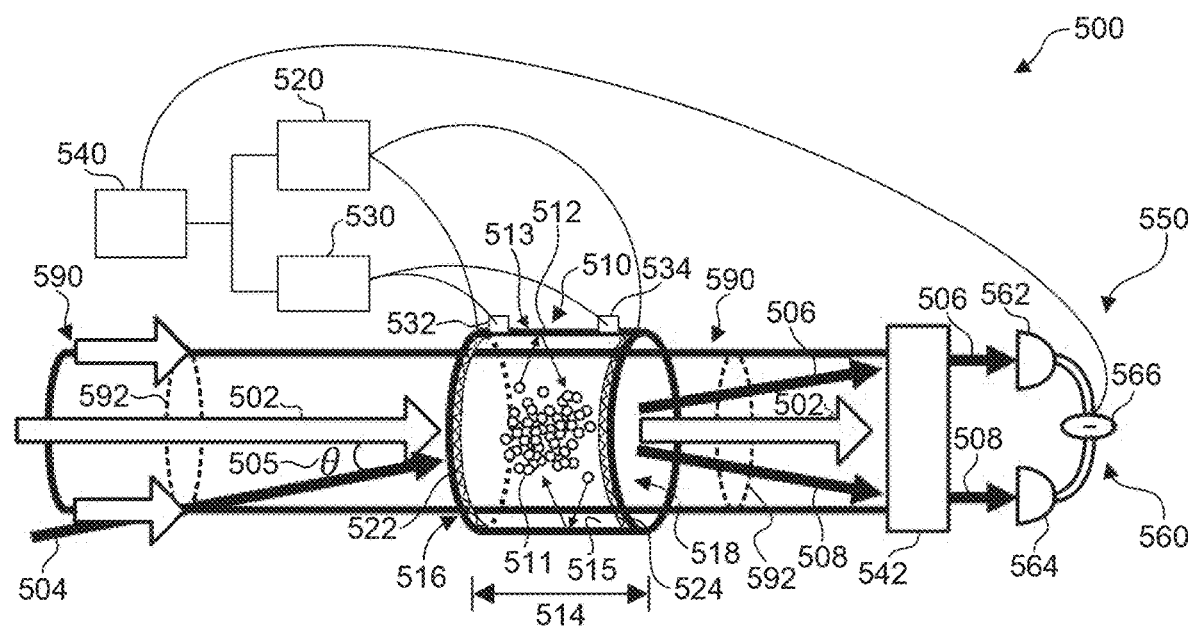
FIG. 5 is a schematic perspective illustration of a DFWM squeezed light apparatus, according to some embodiments.
Figure 6:
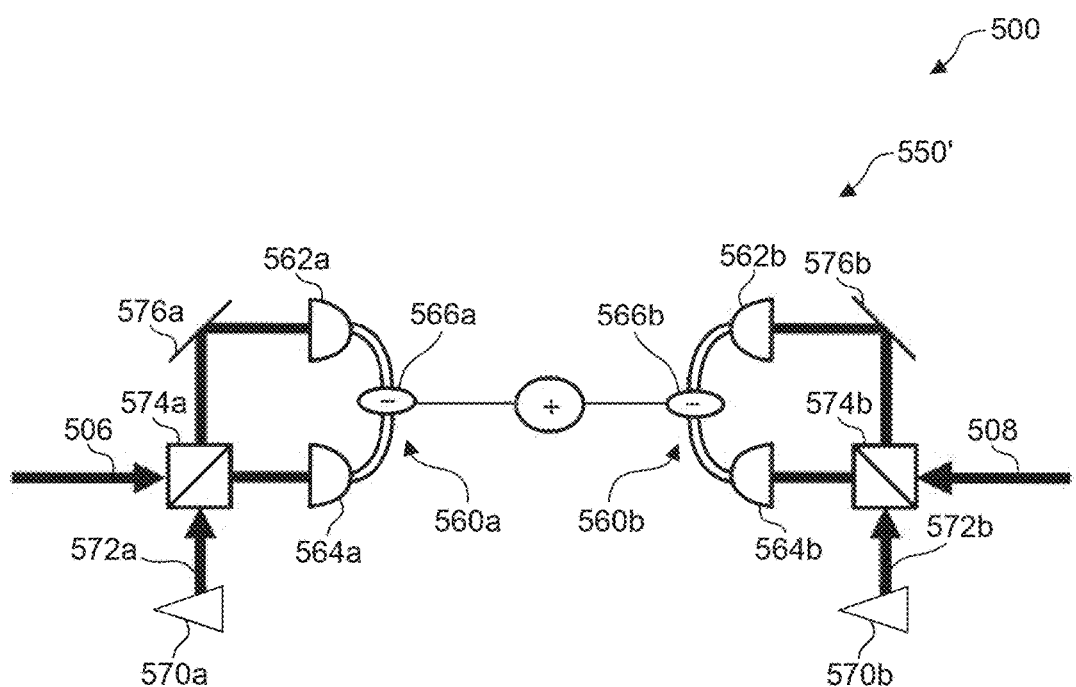
FIG. 6 is a schematic illustration of a joint homodyne detector, according to some embodiments.
Figure 7:
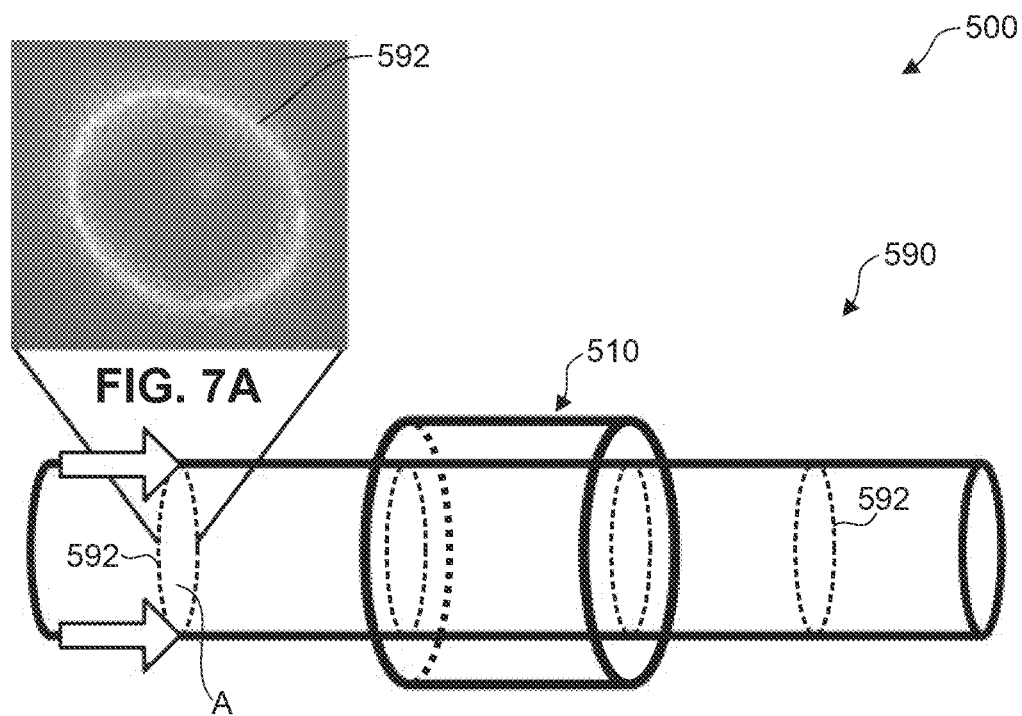
FIG. 7 is a schematic perspective illustration of the repump beam of the DFWM squeezed light apparatus of FIG. 5, according to some embodiments.

FIGS. 5-7 illustrate DFWM squeezed light apparatus 500, according to various exemplary embodiments. DFWM squeezed light apparatuses and systems as discussed below can reduce excess noise and provide a low-power and portable squeezed light source with a reduced size, weight, and power (SWaP) to improve the precision of optical measurements and/or enable continuous-variable quantum communication protocols.

FIG. 5 illustrates DFWM squeezed light apparatus 500, according to various exemplary embodiments. DFWM squeezed light apparatus 500 can be configured to generate squeezed light with an input power of no greater than about 150 mW. DFWM squeezed light apparatus 500 can be configured to generate two-mode squeezed light by DFWM with squeezing of at least 3 dB below shot noise. Although DFWM squeezed light apparatus 500 is shown in FIG. 5 as a stand-alone apparatus and/or system, the embodiments of this disclosure can be used with other optical systems, such as, but not limited to, a portable diode laser, a portable integrated photonic chip, DFWM squeezed light system 900, and/or other optical systems.

Figure 10:
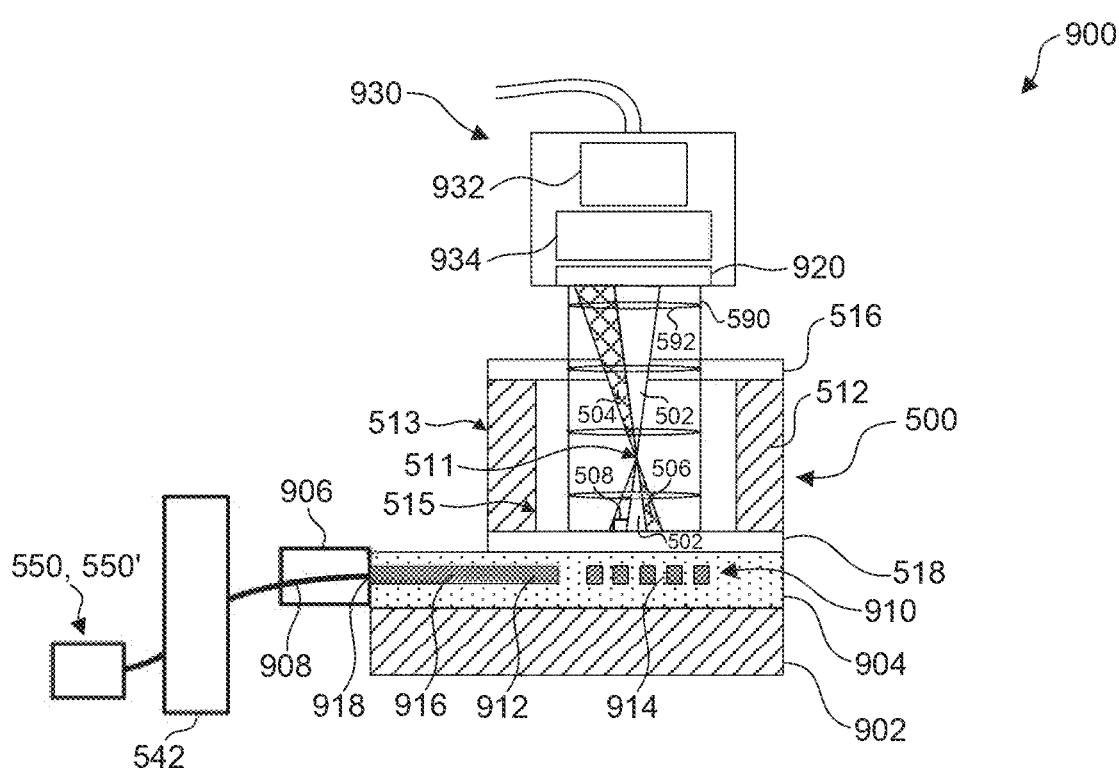
FIG. 10 is a schematic cross-sectional illustration of the DFWM squeezed light system of FIG. 9, according to some embodiments.

DFWM squeezed light apparatus 500 can include pump beam 502, probe beam 504, amplified probe beam 506, conjugate beam 508, vapor cell 510, heating system 520, temperature sensing system 530, processor 540, optical block 542, balanced differential detector 550, and/or repump beam 590. Similar to forward-scattering geometry 400 shown in FIG. 4, pump beam 502 and probe beam 504 can propagate at a small angle 505 and overlap in vapor cell 510 to generate amplified probe beam 506 and conjugate beam 508 by DFWM. Pump beam 502, probe beam 504, and vapor cell 510 can be configured to generate two-mode squeezed light (e.g., amplified probe beam 506 and conjugate beam 508) by DFWM, for example, with squeezing of at least 3 dB below shot noise. In some embodiments, DFWM squeezed light apparatus 500 can generate two-mode squeezed light by DFWM with squeezing of at least 6 dB below shot noise. In some embodiments, DFWM squeezed light apparatus 500 can generate single-mode squeezed light by DFWM. In some embodiments, pump beam 502, probe beam 506, and/or repump beam 590 can be produced by an optical source (not shown). For example, as shown in FIG. 10, optical source 932 can be a compact coherent light source (e.g., diode laser, distributed feedback (DFB) laser, etc.) configured to produce pump beam 502, probe beam 506, and/or repump beam 590.

Pump beam 502 can be configured to excite an atomic vapor 511 in vapor cell 510, for example, from a ground state (e.g., ground state 210, e.g., $5S_{1/2}$, shown in FIG. 2) to an excited state (e.g., virtual excited state 230 shown in FIG. 2). Pump beam 502 can include an input power of no greater than about 150 mW. In some embodiments, the input power of pump beam 502 can be no greater than about 50 mW. In some embodiments, the input power of pump beam 502 can be no greater than about 20 mW. For example, pump beam 502 can be produced by a low-power portable diode laser and/or a DFB laser. In some embodiments, pump beam 502 can be produced by a pump source (not shown). For example, as shown in FIG. 10, optical source 932 can be a compact coherent light source (e.g., diode laser, DFB laser, etc.) configured to produce pump beam 502. In some embodiments, pump beam 502 can be polarized (e.g., linearly, circularly, etc.). For example, pump and probe beams 502, 504 can be cross-polarized (e.g., orthogonal). In some embodiments, pump beam 502 can include a wavelength in the visible, near-infrared, and/or infrared. For example, the wavelength of pump beam 502 can be about 780.2 nm, for example, when atomic vapor 511 comprises Rb.

Probe beam 504 can be configured to overlap pump beam 502 inside vapor cell 510 such that pump beam 502, probe beam 504, and atomic vapor 511 can undergo DFWM. Probe beam 504 can include an input power of no greater than about 15 mW (e.g., an order of magnitude lower than pump beam 502). In some embodiments, the input power of probe beam 504 is about 1 µW to about 0.5 mW. For example, probe beam 504 can be about 100 µW. In some embodiments, probe beam 504 can include a portion of pump beam 502. For example, a portion of pump beam 502 can be siphoned off via a beamsplitter (e.g., 99:1) to form separate probe beam 504. In some embodiments, probe beam 504 can be produced by a probe source (not shown) and/or a pump source (not shown). For example, as shown in FIG. 10, optical source 932 can be a compact coherent light source (e.g., diode laser, DFB laser, etc.) configured to produce probe beam 504. In some embodiments, probe beam 504 can be polarized (e.g., linearly, circularly, etc.). For example, pump and probe beams 502, 504 can be cross-polarized (e.g., orthogonal). In some embodiments, probe beam 504 can include a wavelength in the visible, near-infrared, and/or infrared. For example, the wavelength of probe beam 504 can be about 780.2 nm, for example, when atomic vapor 511 comprises Rb. As shown in FIG. 5, pump and probe beams 502, 504 can propagate at small angle 505. In some embodiments, small angle 505 can be about 0.01 degrees to about 1 degrees. For example, small angle 505 can be about 0.5 degrees.

Vapor cell 510 can be configured to enclose an atomic vapor 511, for example, vaporized Rb (e.g., $^{85}$Rb and/or $^{87}$Rb). As shown in FIG. 5, vapor cell 510 can include atomic vapor 511, cylindrical wall 512, first window 516, second window 518, heating system 520, temperature sensing system 530, processor 540, and/or balanced differential detector 550. Cylindrical wall 512 can include exterior surface 513 and interior surface 515. In some embodiments, as shown in FIG. 5, pump beam 502, probe beam 504, and vapor cell 510 can be arranged in a forward-scattering geometry (e.g., forward-scattering geometry 400 shown in FIG. 4). In some embodiments, as shown in FIG. 5, vapor cell 510 can have a longitudinal length 514. In some embodiments, longitudinal length 514 can be about 0.5 cm to about 10 cm. For example, longitudinal length 514 can be about 8 cm. In some embodiments, vapor cell 510 can have a temperature (e.g., internal) of about 30° C. to about 100° C. For example, the temperature can be about 35° C. to about 45° C.

Atomic vapor 511 can be configured to interact with overlapped pump and probe beams 502, 504 to generate (e.g., via DFWM) amplified probe beam 506 and conjugate beam 508. In some embodiments, atomic vapor 511 can include a rubidium (Rb) vapor. In some embodiments, atomic vapor 511 can include an alkali metal (e.g., sodium (Na), rubidium (Rb), caesium (Cs), etc.). Amplified probe beam 506 can be produced via DFWM and can have an output power of about 1 µW to about 15 mW. For example, probe beam 504 can be about 100 µW and amplified probe beam 506 can be about 1 mW, which corresponds to a gain of 10, where gain=(output power of amplified probe beam 506)/(input power of probe beam 504). Conjugate beam 508 can be produced via DFWM and can have an output power of about 1 µW to about 15 mW. Output power of conjugate beam 508 can be approximately equal to (input probe beam 504)*(gain−1).

As shown in FIG. 5, cylindrical wall 512 can be disposed between first and second windows 516, 518 to enclose (e.g., seal under vacuum) atomic vapor 511. In some embodiments, cylindrical wall 512 can include copper, glass, and/or any other material with a high thermal conductivity. First and second windows 516, 518 can be configured to transmit (e.g., focus) pump and probe beams 502, 504 into atomic vapor 511 and transmit generated amplified probe beam 506 and conjugate beam 508 to balanced differential detector 550. In some embodiments, as shown in FIG. 5, first and second windows 516, 518 can be disks. In some embodiments, first and second windows 516, 518 can include an anti-reflection (AR) coating. For example, the AR coating can be a selective wavelength notch filter, for example, a bandpass filter of about 780.2 nm. In some embodiments, a focusing element and/or a lens (not shown) can be disposed near and/or integrated with first window 516 and can be configured to focus pump and probe beams 502, 504 into atomic vapor 511.

Heating system 520 can be configured to increase and/or decrease a temperature of vapor cell 510 and/or atomic vapor 511. Heating system 520 can include first and second heaters 522, 524 (e.g., resistive coils) configured to provide heating (e.g., resistive). Heating system 520 can be coupled (e.g., electrically) to vapor cell 510, for example, first and second windows 516, 518. In some embodiments, first and second windows 516, 518 can have a temperature (e.g., exterior surface temperature) greater than an exterior surface 513 of cylindrical wall 512. For example, as shown in FIG. 5, first and second windows 516, 518 can include first and second heaters 522, 524 (e.g., resistive coils) disposed radially around first and second windows 516, 518, respectively. In some embodiments, first and second heaters 522, 524 (e.g., resistive coils) can be configured to heat first and second windows 516, 518 such that a thermal gradient is formed inside vapor cell 510. For example, the thermal gradient can have a cooler region about a centroid of cylindrical wall 512 to condense atomic vapor 511 and reduce adsorption, absorption, and/or Van der Waals interactions of atomic vapor 511 on first and second windows 516, 518. In some embodiments, heating system 520 can provide vapor cell 510 and/or atomic vapor 511 with a temperature (e.g., internal) of about 30° C. to about 100° C. For example, the temperature of vapor cell 510 and/or atomic vapor 511 can be about 35° C. to about 45° C. In some embodiments, first and second heaters 522, 524 can be resistive, electric, thermoelectric, radiative, convective, heat pump, Peltier, etc. For example, as shown in FIG. 5, first and second heaters 522, 524 can be resistive coils.

Temperature sensing system 530 can be configured to measure and/or monitor a temperature of vapor cell 510 and/or atomic vapor 511. Temperature sensing system 530 can include first and second temperature sensors 532, 534 (e.g., thermocouples) configured to sense a temperature of vapor cell 510, for example, exterior surface 513 of cylindrical wall 512. Temperature sensing system 530 can be coupled (e.g., electrically) to vapor cell 510, for example, exterior surface 513 of cylindrical wall 512. In some embodiments, temperature sensing system 530 can provide a feedback signal to processor 540 and/or heating system 520 in order to maintain, increase, and/or decrease a temperature of vapor cell 510 and/or atomic vapor 511. In some embodiments, first and second temperature sensors 532, 534 can be a thermocouple, a thermistor, a resistance temperature detector (RTD), an infrared sensor, etc. For example, as shown in FIG. 5, first and second heaters 522, 524 can be thermocouples disposed on exterior surface 513 of cylindrical wall 512.

Processor 540 can be configured to control heating system 520, temperature sensing system 530, and/or balanced differential detector 550. For example, processor 540 can receive temperature signals from temperature sensing system 530 and adjust heating system 520 (e.g., provide voltage and/or current) to maintain a specific temperature of vapor cell 510 and/or atomic vapor 511. Further, processor 540 can measure squeezing between amplified probe beam 506 and conjugate beam 508, for example, squeezing of at least 3 dB below shot noise. As shown in FIG. 5, processor 540 can be coupled (e.g., electrically) to heating system 520, temperature sensing system 530, and/or balanced differential detector 550. In some embodiments, processor 540 can maintain a temperature on first and second windows 516, 518 greater than exterior surface 513 of cylindrical wall 512. In some embodiments, processor 540 can maintain vapor cell 510 and/or atomic vapor 511 at a temperature (e.g., internal) of about 30° C. to about 100° C. For example, the temperature of vapor cell 510 and/or atomic vapor 511 can be about 35° C. to about 45° C.

Optical block 542 can be configured to utilize two-mode squeezed light (e.g., amplified probe beam 206 and conjugate beam 208) produced by DFWM squeezed light apparatus 500. For example, optical block 542 can conduct optical measurements (e.g., user experiment(s)) and/or implement continuous-variable quantum communication protocols (e.g., encryption of information along a communication channel) with the two-mode squeezed light (e.g., amplified probe beam 206 and conjugate beam 208) prior to amplified probe beam 206 and conjugate beam 208 being detected. In some embodiments, as shown in FIG. 5, optical block 542 can be disposed between the outputted two-mode squeezed light (e.g., amplified probe beam 206 and conjugate beam 208) and balanced differential detector 550. In some embodiments, optical block 542 can be omitted and is an optional optical path of amplified probe beam 206 and conjugate beam 208.

Figure 11:
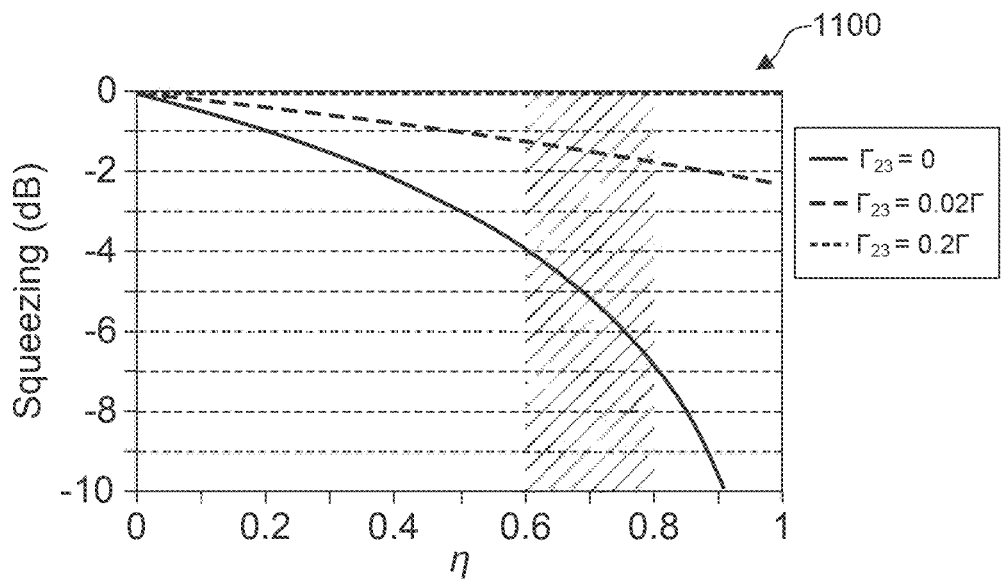
FIG. 11 is a schematic illustration of a plot of squeezing, according to some embodiments.

Balanced differential detector 550 can be configured to measure squeezing between amplified probe beam 506 and conjugate beam 508. As shown in FIG. 5, balanced differential detector 550 can include intensity-difference detector 560 with first and second detectors 562, 564 and intensity-difference output 566. First and second detectors 562, 564 can be configured to receive amplified probe beam 506 and conjugate beam 508, respectively, and intensity-difference output 566 can be coupled to processor 540. Intensity-difference detector 560 can be configured to subtract amplified probe beam 506 and conjugate beam 508 intensity signals measured by first and second detectors 562, 564, respectively. In some embodiments, balanced differential detector 550 can measure squeezing of amplified probe beam 506 and conjugate beam 508 by DFWM of at least 3 dB below shot noise. In some embodiments, balanced differential detector 550 can measure squeezing of amplified probe beam 506 and conjugate beam 508 by DFWM of at least 6 dB below shot noise. For example, as shown in FIG. 11, squeezing plot 1100 (e.g., for intensity-difference detection, forward-scattering geometry, as shown in FIG. 5) for about zero decoherence (e.g., decoherence rate $\Gamma_{23}$=0) indicates that DFWM squeezed light apparatus 500 can achieve (e.g., an input power density of 10 W/cm$^2$ for pump beam 502) squeezing of about 7 dB below shot noise for a quantum efficiency (η) of 0.8 for balanced differential detector 550. In some embodiments, balanced differential detector 550 and/or processor 540 can include a spectrum analyzer (not shown).

In some embodiments, DFWM squeezed light apparatus 500 can include balanced differential detector 550 and/or joint homodyne detector 550'. For example, as shown in FIG. 6, DFWM squeezed light apparatus 500 can include joint homodyne detector 550'. In some embodiments, balanced differential detector 550 can include an intensity-difference detector 560. In some embodiments, as shown in FIG. 6, joint homodyne detector 550' can include homodyne detectors 560a, 560b.

Figure 9:
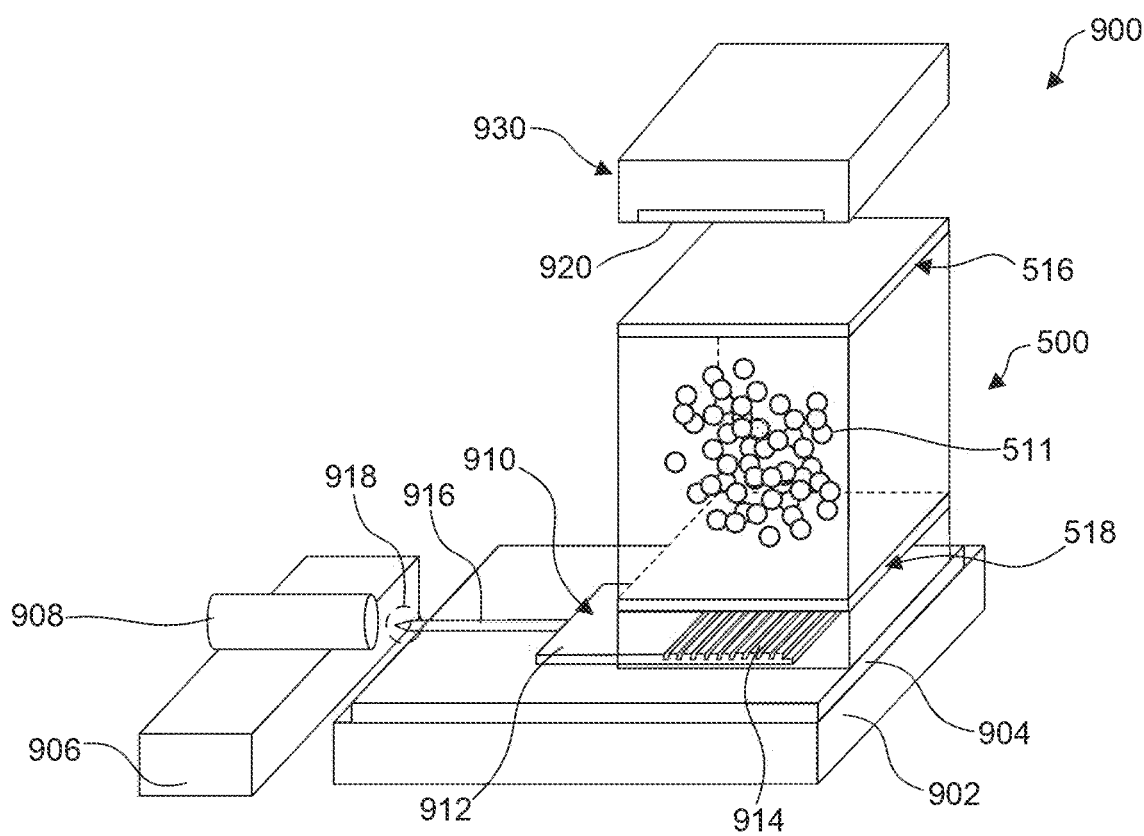
FIG. 9 is a schematic perspective illustration of a DFWM squeezed light system, according to some embodiments.

In some embodiments, DFWM squeezed light apparatus 500 can include a portable diode laser (not shown) configured to provide pump beam 502, probe beam 504, and/or repump beam 590. For example, as shown in FIG. 10, DFWM squeezed light apparatus 500 can include optical source 932 that can be a portable diode laser. In some embodiments, DFWM squeezed light apparatus 500 can include a portable diode laser (not shown) that can have a volume of no greater than about 100 cm$^3$. In some embodiments, DFWM squeezed light apparatus 500 can include a portable diode laser (not shown) that can have an output power of no greater than about 150 mW. In some embodiments, DFWM squeezed light apparatus 500 can include a portable integrated photonic chip (not shown). For example, as shown in FIGS. 9 and 10, DFWM squeezed light apparatus 500 can be incorporated in DFWM squeezed light system 900 that can include a portable integrated photonic chip.

Figure 8:
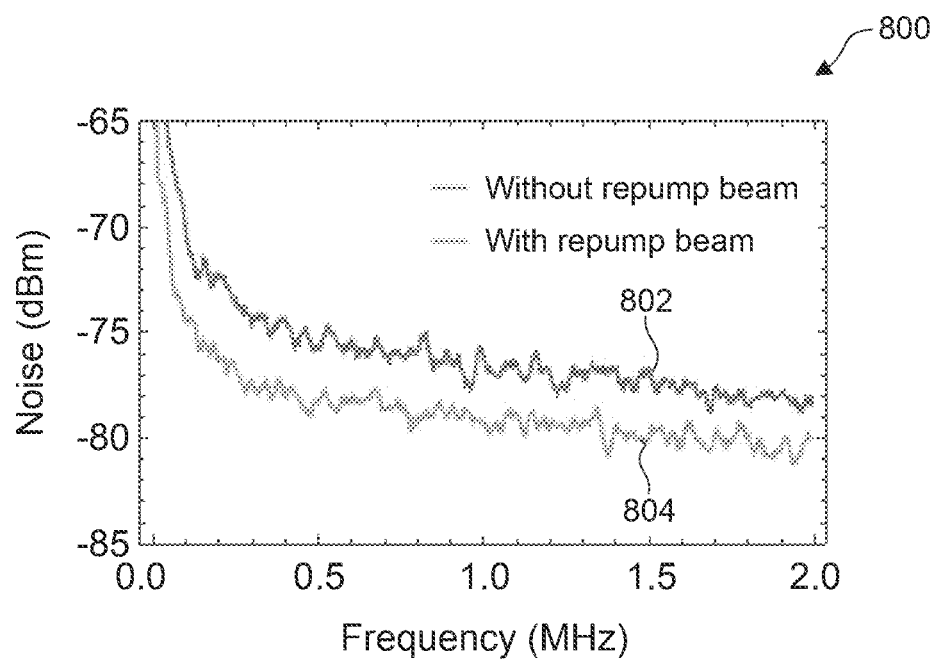
FIG. 8 is a schematic illustration of a plot of noise, according to some embodiments.

In some embodiments, DFWM squeezed light apparatus 500 can include repump beam 590 configured to optically pump atomic vapor 511 to a ground state (e.g., ground state 210, e.g., $5S_{1/2}$, F=3 shown in FIG. 2) and decrease the atomic decoherence rate ($\Gamma_{23}$) of atomic vapor 511. For example, as shown in FIGS. 7, 7A, and 8, repump beam 590 of DFWM squeezed light apparatus 500 can be utilized to optically pump atomic vapor 511, decrease the atomic decoherence rate ($\Gamma_{23}$, written in FIG. 11 in terms of the spontaneous emission rate $\Gamma$), and lower noise (e.g., in decibel-milliwatts) of DFWM squeezed light apparatus 500. In some embodiments, the spontaneous emission rate $\Gamma$ is approximately 2π×6 MHz, for example, for Rb.

FIG. 6 illustrates another exemplary detector, joint homodyne detector 550', for DFWM squeezed light apparatus 500 shown in FIG. 5, according to an exemplary embodiment. The embodiments of balanced differential detector 550 shown in FIG. 5 and the embodiments of joint homodyne detector 550' shown in FIG. 6 may be similar. Similar reference numbers are used to indicate similar features of the embodiments of balanced differential detector 550 shown in FIG. 5 and the similar features of the embodiments of joint homodyne detector 550' shown in FIG. 6. The main difference between the embodiments of balanced differential detector 550 shown in FIG. 5 and the embodiments of joint homodyne detector 550' shown in FIG. 6 is that joint homodyne detector 550' includes homodyne detectors 560a, 560b configured to detect quadrature-squeezed noise of DFWM squeezed light apparatus 500 from amplified probe beam 506 and conjugate beam 508, rather than intensity-difference squeezed noise from intensity-difference detector 560 shown in FIG. 5. Although joint homodyne detector 550' is shown in FIG. 6 as a stand-alone apparatus and/or system, the embodiments of this disclosure can be used with other optical systems, such as, but not limited to, DFWM squeezed light apparatus 500, DFWM squeezed light system 900, and/or other optical systems.

As shown in FIG. 6, an exemplary aspect of joint homodyne detector 550' is homodyne detectors 560a, 560b. Joint homodyne detector 550' can be configured to measure squeezing between amplified probe beam 506 and conjugate beam 508. As shown in FIG. 6, joint homodyne detector 550' can include homodyne detectors 560a, 560b. Homodyne detection uses a single reference frequency to extract a modulated signal from a noisy background. For example, homodyne detection extracts encoded information from an oscillating signal (e.g., phase and/or frequency) by comparing that signal with a standard reference oscillation (e.g., identical to the signal if it carried null information).

First homodyne detector 560a can be configured to measure amplified probe beam 506. First homodyne detector 560a can include first and second detectors 562a, 564a, first homodyne output 566a, first phase shifting element 570a (e.g., acousto-optic modulator (AOM), electro-optic modulator (EOM), piezoelectric (PZT) transducer, etc.), first reference beam 572a (e.g., first phase shifting element 570a can be configured to measure a particular quadrature of amplified probe beam 506), first beamsplitter 574a, and/or first mirror 576*a*. First beamsplitter 574*a* can be configured to combine amplified probe beam 506 and first reference beam 572*a* and direct them to first mirror 576*a* and second detector 564*a*. First mirror 576*a* can be configured to direct overlapped amplified probe beam 506 and first reference beam 572*a* to first detector 562*a*. In some embodiments, first mirror 576*a* can be omitted and overlapped amplified probe beam 506 and first reference beam 572*a* can be coupled directly into first detector 562*a*. First and second detectors 562*a*, 564*a* can be configured to receive first and second components of overlapped amplified probe beam 506 and first reference beam 572*a* (e.g., formed by 50:50 beamsplitter), respectively, and first homodyne output 566*a* can be coupled to second homodyne output 566*b* and/or processor 540. First homodyne detector 560*a* can be configured to subtract first and second components of amplified probe beam 506 intensity signals measured by first and second detectors 562*a*, 564*a*, respectively, and extract noise quadrature statistics of amplified probe beam 506 relative to first reference beam 572*a*.

Second homodyne detector 560*b* can be configured to measure conjugate beam 508. Similarly, second homodyne detector 560*b* can include first and second detectors 562*b*, 564*b*, second homodyne output 566*b*, second phase shifting element 570*b* (e.g., acousto-optic modulator (AOM), electro-optic modulator (EOM), piezoelectric (PZT) transducer, etc.), second reference beam 572*b* (e.g., second phase shifting element 570*b* can be configured to measure a particular quadrature of conjugate beam 508), second beamsplitter 574*b*, and second mirror 576*b*. Second beamsplitter 574*b* can be configured to combine conjugate beam 508 and second reference beam 572*b* and direct them to second mirror 576*b* and second detector 564*b*. Second mirror 576*b* can be configured to direct overlapped conjugate beam 508 and second reference beam 572*b* to first detector 562*b*. In some embodiments, second mirror 576*b* can be omitted and overlapped conjugate beam 508 and second reference beam 572*b* can be coupled directly into first detector 562*b*. First and second detectors 562*b*, 564*b* can be configured to receive first and second components of overlapped conjugate beam 508 and second reference beam 572*b* (e.g., formed by 50:50 beamsplitter), respectively, and second homodyne output 566*b* can be coupled to first homodyne output 566*a* and/or processor 540. Second homodyne detector 560*b* can be configured to subtract first and second components of conjugate beam 508 intensity signals measured by first and second detectors 562*b*, 564*b*, respectively, and extract noise quadrature statistics of conjugate beam 508 relative to second reference beam 572*b*.

In some embodiments, joint homodyne detector 550' can measure squeezing of amplified probe beam 506 and conjugate beam 508 by DFWM of at least 3 dB below shot noise. In some embodiments, joint homodyne detector 550' can measure squeezing of amplified probe beam 506 and conjugate beam 508 by DFWM of at least 6 dB below shot noise.

FIGS. 7 and 7A illustrate repump beam 590 in DFWM squeezed light apparatus 500 shown in FIG. 5, according to an exemplary embodiment. Repump beam 590 can be configured to reduce noise in DFWM squeezed light apparatus 500. Repump beam 590 can be configured to optically pump atomic vapor 511 to a ground state (e.g., ground state 210, e.g., $5S_{1/2}$, F=3 shown in FIG. 2) and decrease the atomic decoherence rate ($\Gamma_{23}$) of atomic vapor 511. For example, repump beam 590 can be configured to reduce spontaneous emission into the spatial modes of amplified probe beam 506 and conjugate beam 508. Repump beam 590 can cause spontaneous emission of atoms in atomic vapor 511 near the edges (e.g., interior surface 515) of vapor cell 510, and can reduce spontaneous emission of atoms in atomic vapor 511 involved in the DFWM process (e.g., near center of vapor cell 510). In some embodiments, DFWM squeezed light apparatus 500 can include one or more repump beams 590 configured to optically pump atomic vapor 511 to a ground state (e.g., ground state 210, e.g., $5S_{1/2}$, F=3 shown in FIG. 2) and decrease the atomic decoherence rate (e.g., $\Gamma_{23}$ shown in FIG. 11) of atomic vapor 511. For example, DFWM squeezed light apparatus 500 can be arranged in a backward-scattering geometry (e.g., backward-scattering geometry 300 shown in FIG. 3) and two counter-propagating collimated repump beams (e.g., each similar to repump beam 590 shown in FIG. 5) can interact with atomic vapor 511 of DFWM squeezed light apparatus 500. In some embodiments, repump beam 590 can be from the same optical source (e.g., portable diode laser, etc.) as pump and probe beams 502, 504, for example, optical source 932 shown in FIG. 10.

FIG. 7A is a partial cross-sectional view of repump beam 590. In some embodiments, repump beam 590 can be cylindrical, for example, a solid cylinder with a solid elliptical cross-section along an optical axis of repump beam 590. For example, as shown in FIGS. 7 and 7A, repump beam 590 can be an annulus 592 (e.g., a ring with a hollow center), for example, with an annular cross-section along an optical axis of repump beam 590. In some embodiments, repump beam 590 can include two counter-propagating annular repump beams (e.g., similar to repump beam 590 with annulus 592), for example, in a backward-scattering geometry (e.g., backward-scattering geometry 300 as shown in FIG. 3). The annular shape 592 of repump beam 590 can be configured to decrease the atomic decoherence rate ($\Gamma_{23}$) of atomic vapor 511 by promoting optical pumping of atomic vapor 511, particularly for those atoms of atomic vapor 511 near (e.g., via thermal drifting) interior surface 515 that have undergone spin-changing collisions with of cylindrical wall 512. As shown in FIG. 8, noise plot 800 with noise signal without repump beam 802 and noise signal with repump beam 804 indicates that noise (e.g., in decibel-milliwatts (dBm)) of DFWM squeezed light apparatus 500 can be lowered with the addition of repump beam 590 in vapor cell 510. In some embodiments, repump beam 590 can be collimated through vapor cell 510 (e.g., not focused into atomic vapor 511 by any focusing element).

In some embodiments, repump beam 590 can have an input power similar to that of an input power of pump beam 502. For example, the input power of repump beam 590 can be approximately the same as an input power of pump beam 502 (e.g., about 20 mW to about 150 mW). In some embodiments, repump beam 590 can have an input power no greater than about an input power of pump beam 502. For example, the input power of repump beam 590 can be no greater than about 150 mW. In some embodiments, pump beam 502, probe beam 504, and repump beam 590 can be configured to reduce spontaneous emission of atomic vapor 511 and generate two-mode squeezed light by DFWM in atomic vapor 511.

In some embodiments, DFWM squeezed light apparatus 500 can measure squeezing of amplified probe beam 506 and conjugate beam 508 by DFWM of at least 3 dB below shot noise. In some embodiments, DFWM squeezed light apparatus 500 can measure squeezing of amplified probe beam 506 and conjugate beam 508 by DFWM of at least 6 dB below shot noise. For example, as shown in FIG. 11, squeezing plot 1100 (e.g., for intensity-difference detection, forward-scattering geometry, as shown in FIG. 5) for about zero decoherence (e.g., decoherence rate $\Gamma_{23}$=0) indicates that DFWM squeezed light apparatus 500 can achieve (e.g., an input power density of 10 W/cm$^2$ for pump beam 502) squeezing of about 7 dB below shot noise for a quantum efficiency ($\eta$) of 0.8 for balanced differential detector 550.

Exemplary DFWM Squeezed Light System

FIGS. 9 and 10 illustrate DFWM squeezed light system 900, according to various exemplary embodiments. DFWM squeezed light system 900 can reduce excess noise and provide a low-power and portable squeezed light source with a reduced size, weight, and power (SWaP) to improve precision of optical measurements and/or enable certain quantum communication protocols.

FIGS. 9 and 10 illustrate DFWM squeezed light system 900, according to an exemplary embodiment. The embodiments of DFWM squeezed light apparatus 500 shown in FIGS. 5-7 and the embodiments of DFWM squeezed light system 900 shown in FIGS. 9 and 10 may be similar. Similar reference numbers are used to indicate similar features of the embodiments of DFWM squeezed light apparatus 500 shown in FIGS. 5-7 and the similar features of the embodiments of DFWM squeezed light system 900 shown in FIGS. 9 and 10. One difference between the embodiments of DFWM squeezed light apparatus 500 shown in FIGS. 5-7 and the embodiments of DFWM squeezed light system 900 shown in FIGS. 9 and 10 is that DFWM squeezed light system 900 includes portable integrated photonic chip 910 and optical input system 930 to provide a low-power and portable optical system including DFWM squeezed light apparatus 500, for example, with a portable integrated photonic chip (e.g., portable integrated photonic chip 910) and a portable diode laser (e.g., optical input system 930). Although DFWM squeezed light system 900 is shown in FIGS. 9 and 10 as a stand-alone apparatus and/or system, the embodiments of this disclosure can be used with other optical systems, such as, but not limited to, DFWM squeezed light apparatus 500 and/or other optical systems.

DFWM squeezed light system 900 can be configured to provide a low-power and portable squeezed light source. DFWM squeezed light system 900 can include portable integrated photonic chip 910, optical input system 930, and DFWM squeezed light apparatus 500 with atomic vapor 511 enclosed by first and second windows 516, 518 and cylindrical wall 512. As shown in FIGS. 9 and 10, DFWM squeezed light apparatus 500 can be disposed between portable integrated photonic chip 910 and optical input system 930. In some embodiments, DFWM squeezed light system 900 can include DFWM squeezed light apparatus 500. In some embodiments, as shown in FIGS. 9 and 10, DFWM squeezed light apparatus 500 can be arranged in a forward-scattering geometry (e.g., forward-scattering geometry 400 as shown in FIG. 4) with optical input system 930 providing pump beam 502, probe beam 504, and repump beam 590 and portable integrated photonic chip 910 receiving amplified probe beam 506 and conjugate beam 508 and coupling amplified probe beam 506 and conjugate beam 508 to optical block 542, balanced differential detector 550, and/or joint homodyne detector 550'. In some embodiments, DFWM squeezed light apparatus 500 can be arranged in a backward-scattering geometry (e.g., backward-scattering geometry 300 as shown in FIG. 3) with optical input system 930 providing pump beams 502, probe beam 504, and repump beams 590 (e.g., secondary pump and repump beams 502, 590 can be routed to second window 518 side via optics and/or additional waveguides) and portable integrated photonic chip 910 receiving amplified probe beam 506 and conjugate beam 508 (e.g., conjugate beam 508 can be routed to second window 518 side via optics and/or additional waveguides) and coupling amplified probe beam 506 and conjugate beam 508 to optical block 542, balanced differential detector 550, and/or joint homodyne detector 550'.

As shown in FIGS. 9 and 10, an exemplary aspect of DFWM squeezed light system 900 is portable integrated photonic chip 910. Portable integrated photonic chip 910 can be configured to output amplified probe beam 506 and conjugate beam 508 from DFWM squeezed light apparatus 500 to optical block 542 (e.g., user experiment(s), optical measurement(s), communication encryption, quantum communication protocols, etc.), balanced differential detector 550, and/or joint homodyne detector 550'. In some embodiments, as shown in FIG. 10, optical block 542 can be disposed between the outputted two-mode squeezed light (e.g., amplified probe beam 206 and conjugate beam 208) from optical fiber(s) 908 and balanced differential detector 550 and/or joint homodyne detector 550'. In some embodiments, optical block 542 can be omitted and is an optional optical path of amplified probe beam 206 and conjugate beam 208 (e.g., via optical fiber(s) 908). Portable integrated photonic chip 910 can include substrate 902, intermediate layer 904 (e.g., oxide and/or nitride), waveguide 912 with input/output grating 914, waveguide coupling 916 with etched tip 918, and optical coupling 906 with optical fiber(s) 908. As shown in FIG. 10, amplified probe beam 506 and conjugate beam 508 can optically couple to input/output grating 914 of waveguide 912. For example, second window 518 can be disposed atop input/output grating 914. Waveguide coupling 916 can optically couple to optical fiber(s) 908, for example, via etched tip 918. As shown in FIG. 10, optical coupling 906 can be optically coupled (e.g., via optical fiber(s) 908) to optical block 542, balanced differential detector 550, and/or joint homodyne detector 550' in order to utilize and/or measure squeezing between amplified probe beam 506 and conjugate beam 508.

As shown in FIGS. 9 and 10, an exemplary aspect of DFWM squeezed light system 900 is optical input system 930. Optical input system 930 can be configured to input and/or focus pump beam 502, probe beam 504, and/or repump beam 590 into DFWM squeezed light apparatus 500. Optical input system 930 can include optical source 932, beam routing optics 934, and/or focusing optics 920. Optical source 932 can be configured to provide pump beam(s) 502, probe beam 504, and/or repump beam(s) 590. Beam routing optics 934 can be configured to separate pump beam(s) 502, probe beam 504, and/or repump beam(s) 590 and route them to appropriate positions before being projected into DFWM squeezed light apparatus 500 (e.g., forward-scattering geometry, backward-scattering geometry). For example, repump beam 590 can be collimated and beam expanded to encompass pump and probe beams 502, 504 that are arranged relative to each other by small angle 505, and pump and probe beams 502, 504 can be routed toward focusing optics 920 while repump beam 590 bypasses focusing optics 920. Focusing optics 920 can be configured to focus pump beam 502 and probe beam 504 into atomic vapor 511. Repump beam 590 can be collimated through DFWM squeezed light apparatus 500 (e.g., as shown in FIGS. 5, 7, and 10).

In some embodiments, optical source 932 can provide pump beam 502, probe beam 504, and/or repump beam 590. In some embodiments, optical sources for pump beam 502, probe beam 504, and/or repump beam 590 can be combined into a single optical power source and optic assembly (e.g., optical source 932), for example, a portable diode laser. In some embodiments, optical source 932, beam routing optics 934, and/or focusing optics 920 can be combined into a single compact optical assembly (e.g., optical input system 930). In some embodiments, optical source 932 can include a portable diode laser. In some embodiments, DFWM squeezed light system 900 can have a volume of no greater than about 100 cm³. In some embodiments, optical input system 930 can have a volume of no greater than about 100 cm³. In some embodiments, optical input system 930 can have an output power of no greater than about 150 mW. For example, optical source 932 can have an output power of no greater than about 150 mW.

Exemplary Flow Diagram

Figure 12:
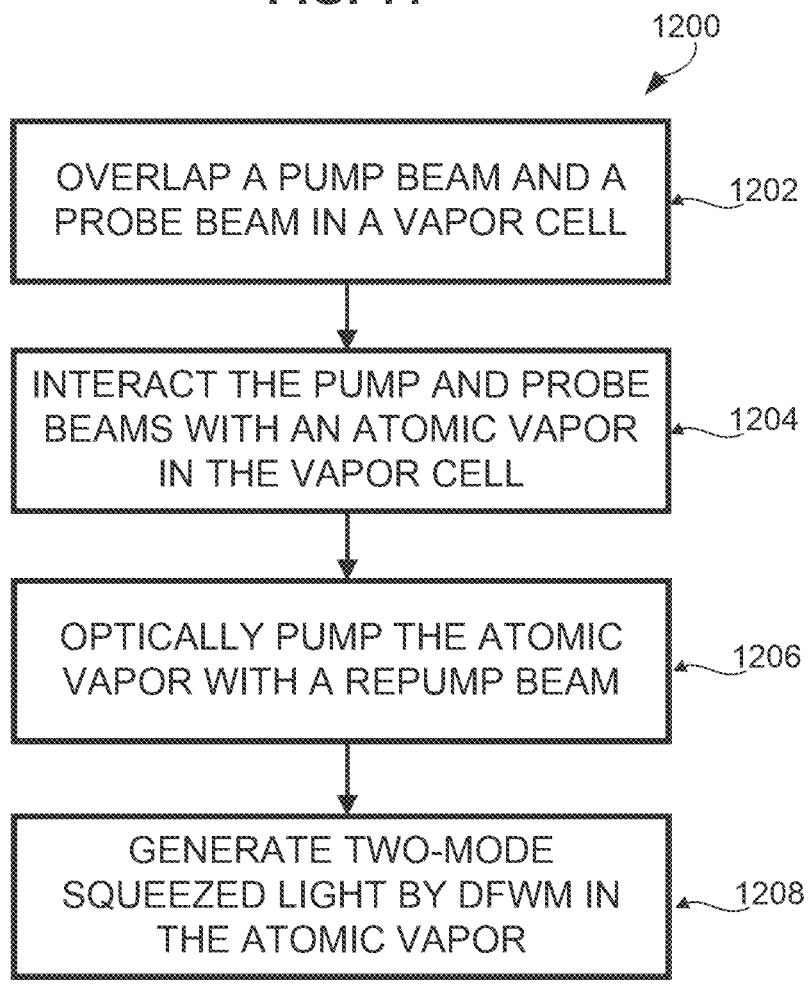
FIG. 12 illustrates a flow diagram for forming a low-power squeezed light source, according to some embodiments.

FIG. 12 illustrates flow diagram 1200 for forming a low-power squeezed light source, according to an embodiment. It is to be appreciated that not all steps in FIG. 12 are needed to perform the disclosure provided herein. Further, some of the steps may be performed simultaneously, sequentially, or in a different order than shown in FIG. 12. Flow diagram 1200 shall be described with reference to FIGS. 5-7. However, flow diagram 1200 is not limited to those example embodiments.

In step 1202, as shown in the example of FIG. 5, pump beam 502 and probe beam 504 can overlap in vapor cell 510. In some embodiments, pump beam 502 can include an input power of no greater than about 150 mW. In some embodiments, pump beam 502 can include an input power of no greater than about 50 mW.

In step 1204, as shown in the example of FIG. 5, overlapped pump and probe beams 502, 504 can interact with atomic vapor 511 in vapor cell 510 to generate amplified probe beam 506 and conjugate beam 508.

In step 1206, as shown in the examples of FIGS. 5-7, repump beam 590 can optically pump atomic vapor 511 to decrease atomic decoherence of atomic vapor 511. In some embodiments, repump beam 590 can include an annular repump beam 592.

In step 1208, as shown in the examples of FIGS. 5-7, two-mode squeezed light can be generated by degenerate four-wave mixing (DFWM) in atomic vapor 511. In some embodiments, two-mode squeezed light can be generated with squeezing of at least 3 dB below shot noise. In some embodiments, two-mode squeezed light can be generated with squeezing of at least 6 dB below shot noise In some embodiments, flow diagram 1200 can further include measuring an intensity-difference squeezing (e.g., with intensity-difference detector 560) between amplified probe beam 506 and conjugate beam 508 with balanced differential detector 550. For example, as shown in FIG. 11, squeezing plot 1100 (e.g., for intensity-difference detection, forward-scattering geometry, as shown in FIG. 5) for about zero decoherence (e.g., decoherence rate $\Gamma_{23}=0$) indicates that DFWM squeezed light apparatus 500 can achieve (e.g., an input power density of 10 W/cm² for pump beam 502) squeezing of about 7 dB below shot noise for a quantum efficiency ($\eta$) of 0.8 for balanced differential detector 550. In some embodiments, flow diagram 1200 can further include measuring quadrature squeezing (e.g., homodyne detectors 560a, 560b) between amplified probe beam 506 and conjugate beam 508 with joint homodyne detector 550'.

It is to be understood that the phraseology or terminology herein is for the purpose of description and not of limitation, such that the terminology or phraseology of the present specification is to be interpreted by those skilled in the relevant art(s) in light of the teachings herein.

The above examples are illustrative, but not limiting, of the embodiments of this disclosure. Other suitable modifications and adaptations of the variety of conditions and parameters normally in the field, and which would be apparent to those skilled in the relevant art(s), are within the spirit and scope of the disclosure.

While specific embodiments have been described above, it will be appreciated that the embodiments may be practiced otherwise than as described. The description is not intended to limit the scope of the claims.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art(s), readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein.

The breadth and scope of the embodiments should not be limited by any of the above-described exemplary embodiments, but should be defined only in accordance with the following claims and their equivalents.

What is claimed is:

1. A degenerate four-wave mixing (DFWM) squeezed light apparatus comprising:
    a pump beam;
    a probe beam configured to overlap the pump beam;
    a vapor cell comprising an atomic vapor, wherein the atomic vapor is configured to interact with the overlapped pump and probe beams to generate an amplified probe beam and a conjugate beam;
    a repump beam configured to optically pump the atomic vapor to a ground state; and
    a detector configured to measure squeezing due to quantum correlations between the amplified probe beam and the conjugate beam,
    wherein the pump beam and the probe beam are configured to generate two-mode squeezed light by DFWM in the atomic vapor.

2. The DFWM squeezed light apparatus of claim 1, wherein the repump beam is configured to decrease atomic decoherence of the atomic vapor.

3. The DFWM squeezed light apparatus of claim 1, wherein the repump beam is configured to reduce noise of the DFWM squeezed light apparatus.

4. The DFWM squeezed light apparatus of claim 1, wherein the repump beam is annular.

5. The DFWM squeezed light apparatus of claim 1, wherein an input power of the repump beam is no greater than an input power of the pump beam.

6. The DFWM squeezed light apparatus of claim 1, wherein the repump beam comprises two counter-propagating repump beams.

7. The DFWM squeezed light apparatus of claim 1, wherein the two-mode squeezed light is configured for continuous-variable entanglement.

8. The DFWM squeezed light apparatus of claim 1, wherein the two-mode squeezed light is configured for continuous-variable quantum communication protocols.

9. The DFWM squeezed light apparatus of claim 1, wherein the two-mode squeezed light comprises a continuous spectrum.

10. The DFWM squeezed light apparatus of claim 1, wherein the two-mode squeezed light comprises squeezing of at least 3 dB below shot noise.

11. A method comprising:
overlapping a pump beam and a probe beam in a vapor cell comprising an atomic vapor;
interacting the atomic vapor with the overlapped pump and probe beams;
optically pumping the atomic vapor with a repump beam; and
generating two-mode squeezed light by degenerate four-wave mixing (DFWM) in the atomic vapor.

12. The method of claim 11, wherein optically pumping comprises decreasing atomic decoherence of the atomic vapor.

13. The method of claim 11, wherein optically pumping comprises reducing noise of the two-mode squeezed light.

14. The method of claim 11, wherein optically pumping comprises applying an annular repump beam.

15. The method of claim 11, wherein optically pumping comprises applying an input power of the repump beam that is no greater than an input power of the pump beam.

16. The method of claim 11, wherein optically pumping comprises applying two counter-propagating repump beams.

17. The method of claim 11, further comprising utilizing the two-mode squeezed light for continuous-variable entanglement.

18. The method of claim 11, further comprising utilizing the two-mode squeezed light for continuous-variable quantum communication protocols.

19. The method of claim 11, wherein interacting comprises generating an amplified probe beam and a conjugate beam.

20. The method of claim 19, further comprising measuring squeezing due to quantum correlations between the amplified probe beam and the conjugate beam.

* * * * *

UNITED STATES PATENT AND TRADEMARK OFFICE
CERTIFICATE OF CORRECTION

Page 1 of 1

PATENT NO. : 12,418,155 B2
APPLICATION NO. : 18/659303
DATED : September 16, 2025
INVENTOR(S) : Bonnie L. Marlow It is certified that error appears in the above-identified patent and that said Letters Patent is hereby corrected as shown below:

In the Specification

Column 5, Line 4, "state a" should be --state $\alpha$--.

Column 5, Line 11, "$X_{\phi=0°}=X_1$" should be --$X_{\phi=0°} = X_1$--.

Column 5, Line 12, "$X_{\phi=90°}=X_2$" should be --$X_{\phi=90°} = X_2$--.

Column 6, Line 34, "$H=\Sigma_{k=1}(\hat{a}^\dagger_k \hat{a}_k + \frac{1}{2})$" should be --$H=\Sigma^N_{k=1}(\hat{a}^\dagger_k \hat{a}_k + \frac{1}{2})$--.

Column 6, Line 34, "$\hat{q}_k=\hat{a}_k+\hat{a}^\dagger_k$" should be --$\hat{q}_k = \hat{a}_k + \hat{a}^\dagger_k$--.

Column 13, Line 46, "efficiency (n)" should be --efficiency ($\eta$)--.

Signed and Sealed this
Twenty-eighth Day of October, 2025

John A. Squires
*Director of the United States Patent and Trademark Office*